United States Patent
Ryu et al.

(10) Patent No.: US 7,133,650 B2
(45) Date of Patent: Nov. 7, 2006

(54) POWER SUPPLY HAVING STABLE RESET FUNCTION IN MOBILE ELECTRONIC UNIT

(75) Inventors: Hun-young Ryu, Busan Metropolitan (KR); Yun-cheal Kim, Changwon-si (KR); Sung-youp Lee, Seoul (KR)

(73) Assignee: Samsung Techwin Co., Ltd., Changwon (KR)

( * ) Notice: Subject to any disclaimer, the term of this patent is extended or adjusted under 35 U.S.C. 154(b) by 394 days.

(21) Appl. No.: 10/760,619

(22) Filed: Jan. 20, 2004

(65) Prior Publication Data

US 2004/0192235 A1 Sep. 30, 2004

(30) Foreign Application Priority Data

Jan. 18, 2003 (KR) .................... 10-2003-0003467

(51) Int. Cl.
*H01Q 11/12* (2006.01)
(52) U.S. Cl. ............... 455/127.1; 455/343.1; 455/556.1; 455/574; 348/372
(58) Field of Classification Search ............. 455/127.1, 455/572, 574, 343.1, 557, 573, 556.1
See application file for complete search history.

(56) References Cited

U.S. PATENT DOCUMENTS 5,940,747 A * 8/1999 Grohgans et al. ........ 455/168.1
6,920,528 B1 * 7/2005 Chan ...................... 711/115
2003/0020525 A1 * 1/2003 Shigemasa et al. ......... 327/143

* cited by examiner

*Primary Examiner*—Quochien B. Vuong
*Assistant Examiner*—Tuan H. Nguyen
(74) *Attorney, Agent, or Firm*—Gardner Carton & Douglas LLP

(57) ABSTRACT

A power supply having a stable reset function a mobile electronic unit is provided that simultaneously resets the digital signal processing unit and the controller in a mobile electronic unit. The stable reset function occurs during the period of time when the power source of the mobile electronic unit is changed by removing an AC adapter from the mobile electronic unit and applying the power source of the battery which was previously installed in the mobile electronic unit. The power supply having a stable reset function includes a power supply unit, a first reset unit, which, when at least one output voltage from the power supply unit is abnormal, generates a first reset signal, a second reset unit, which, when the input power source from the adapter or battery is less than a predetermined reference voltage, generates a first reset signal, and a controller which is reset by means of one of the first and second reset signals, and when the second reset signal is applied thereto, controls the power supply unit to cut off the source voltages for the digital signal processing unit.

19 Claims, 3 Drawing Sheets

POWER SUPPLY HAVING STABLE RESET FUNCTION IN MOBILE ELECTRONIC UNIT

This application claims priority to Korean Patent Application No. 2003-3467, filed on Jan. 18, 2003, in the Korean Intellectual Property Office, the disclosure of which is incorporated herein in its entirety by reference.

FIELD OF THE INVENTION

The present invention is directed to a mobile electronic unit with a power supply having a stable reset function that simultaneously resets the digital signal processing unit and the controller in a mobile electronic unit. The stable reset function occurs during the period of time when the power source of the mobile electronic unit is changed by removing an AC adapter from the mobile electronic unit and applying the power source of the battery which was previously installed in the mobile electronic unit.

BACKGROUND OF THE INVENTION

A digital camera is a type of mobile electronic unit which is fundamentally different than a conventional film-type camera. The digital camera photographs a subject through an optical lens system and stores photographed image information as digital data in a memory card. The digital data stored in the memory card can be processed using a computer and can be easily supplied via a network. Accordingly, the demand for digital cameras is expected to substantially increase.

In order for a digital camera to operate, a power source must be supplied from an AC adapter or a battery. If an AC adapter is connected to a digital camera in which a battery has already been installed, the digital camera uses the power supplied from the AC adapter because a ground is connected to the negative terminal of the AC adapter. If the AC adapter is removed from the digital camera in which a battery has been installed, the digital camera uses the power supplied from the battery because the ground is connected to the negative terminal of the battery. Since the AC adapter cannot be removed at the same time the battery power source is applied, the ground is in a floating state during the time period while the AC adapter is being removed. During this time period, the battery source voltage applied to the digital camera is rapidly reduced. Until the AC adapter is completely removed from the digital camera and the power source is supplied from the battery (several to several tens of ms), the digital signal processing unit is in an unstable state, and the LCD screen displays an abnormal image. Accordingly, a need exists for a stable reset function to simultaneously reset the digital signal processing unit and the controller in a mobile electronic unit digital when the power source is changed from an AC adapter to the battery in the mobile electronic unit.

In FIGS. 1 and 2, a conventional camera power supply unit 14 that generates source voltages is connected to a power source through a fuse 13. For example, first and second source voltages Vd1 and Vd2 are supplied to a digital signal processing unit 15, and a source voltage Vm is supplied to a controller 16, specifically a microcontroller. The camera power supply unit 14 uses the power source supplied from an adapter 11 or a battery 12. A reset unit 17 determines whether the source voltage Vm for the controller 16 supplied from the camera power supply unit 14 is abnormal and resets the controller 16 if the source voltage Vm is abnormal.

However, in FIG. 2, a DC 5V power source is supplied from the adapter 11 at periods b and c where the ground is in a floating state, that is, during a transition period between removing the adapter 11 and applying the power source from the battery 12. During the transition period, the voltage is reduced to 0V at a steep slope during period b and is maintained at 0V during period c. The interval of periods b and c varies according to the speed at which the AC adapter 11 is removed from the digital camera. After period c, a power source Vbatt, supplied from the battery 12, is applied to the digital camera.

The source voltage Vm applied to the controller 16 is not reduced as rapidly as the DC 5V power source supplied from the adapter 11. The source voltage Vm is maintained at an original voltage until part of the way into period c, but then is reduced, and finally restored to the original voltage at a predetermined period of time after period c. The first and second source voltages Vd1 and Vd2 of the digital signal processing unit 15 start to be reduced during period b, but are restored to the original voltage at a predetermined period of time after period c.

As described above, the respective source voltages Vd1, Vd2, and Vm of the digital signal processing unit 15 and the controller 16 are not simultaneously reduced due to a communication error between the digital signal processing unit 15 and the controller 16 during the transition period between removing the adapter 11 and applying the power source of the battery 12. This causes several problems to occur. During period c, the controller 16 operates normally because the fall in power source voltage is small. However, the digital signal processing unit 15 is reset and then starts operating again without an initialization process which causes the LCD screen to display an abnormal image.

SUMMARY OF THE INVENTION

The present invention provides a power supply to simultaneously reset the digital signal processing unit and the controller in a mobile electronic unit during the transition period between removing an AC adapter and applying the power source from a battery which was previously installed in the mobile electronic unit.

One embodiment of the present invention provides a power supply having a stable reset function for the digital signal processing unit in a mobile electronic unit. The digital signal processing unit processes a video signal or an audio signal input in the mobile electronic unit. The power supply includes a power supply unit, a first reset unit, a second reset unit, and a controller. The power supply unit generates a plurality of source voltages for elements of the mobile electronic unit that use an input power source supplied from an AC adapter or battery.

The first reset unit generates a first reset signal when at least one output voltage from the power supply unit is abnormal. The second reset unit generates a first reset signal when the input power source from the adapter or the battery is less than a predetermined reference voltage. The controller may be reset by means of the first and second reset signals. When the second reset signal is applied to the controller, the controller controls the power supply unit by cutting off the source voltages for the digital signal processing unit.

The second reset unit may include a first and second transistor. The power supplied by the adapter is applied to a base terminal of the first transistor and the source voltage for the digital signal processing unit is applied to an emitter terminal of the first transistor. The second transistor, which is connected to a collector terminal of the first transistor, generates the reset signal depending on whether the first transistor is turned on.

BRIEF DESCRIPTION OF THE DRAWINGS

The above and other features and advantages of the present invention will become more apparent by describing in detail an exemplary embodiment thereof with reference to the attached drawings in which.

DETAILED DESCRIPTION OF THE INVENTION

Hereinafter, a power supply having a stable reset function according to an embodiment of the present invention will be described in detail with reference to the accompanying drawings.

Figure 1:
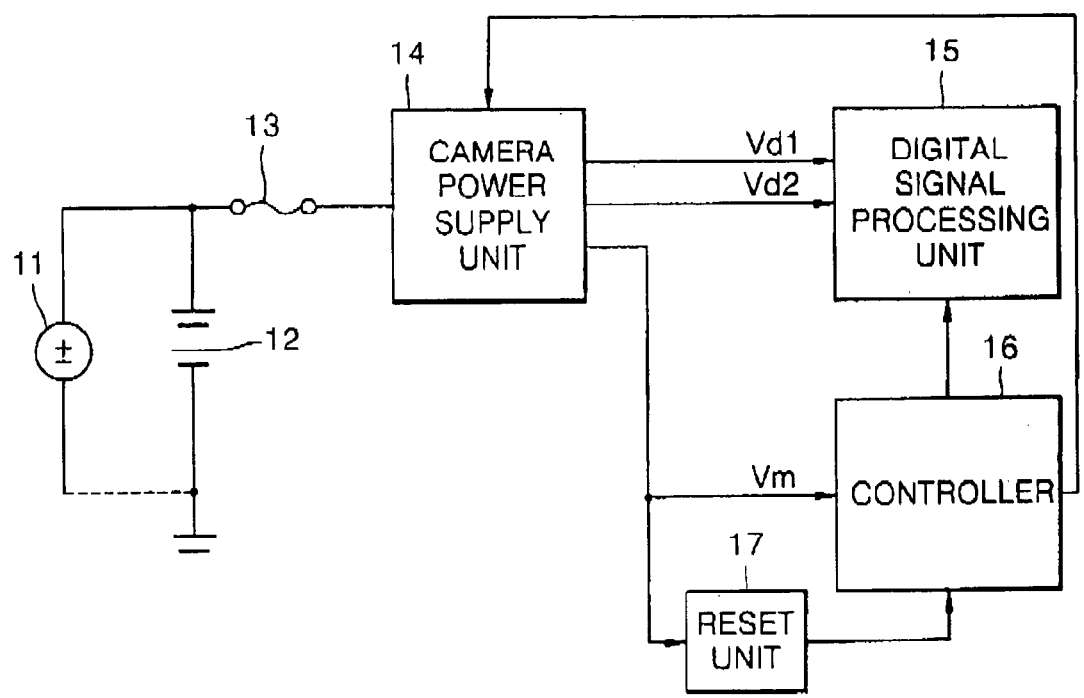
FIG. 1 shows a conventional power supply in a mobile electronic unit.
Figure 2:
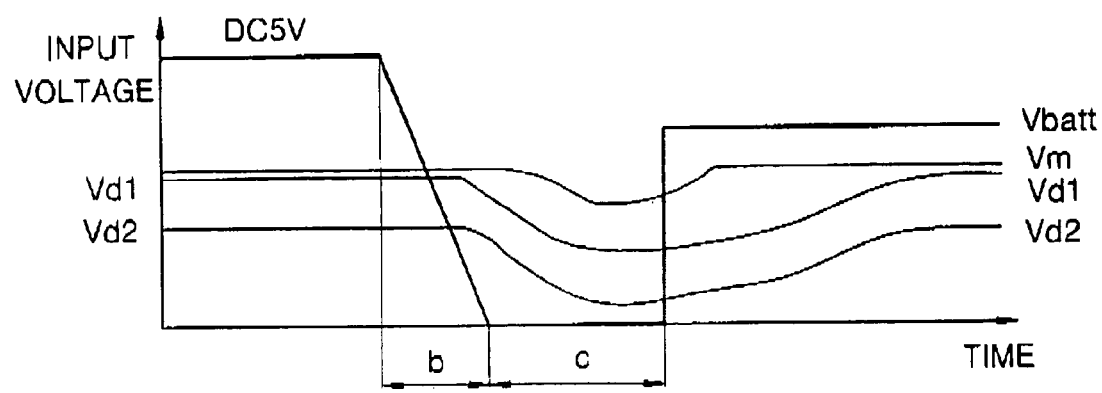
FIG. 2 is a waveform diagram of a source voltage of each unit of FIG. 1.
Figure 3:
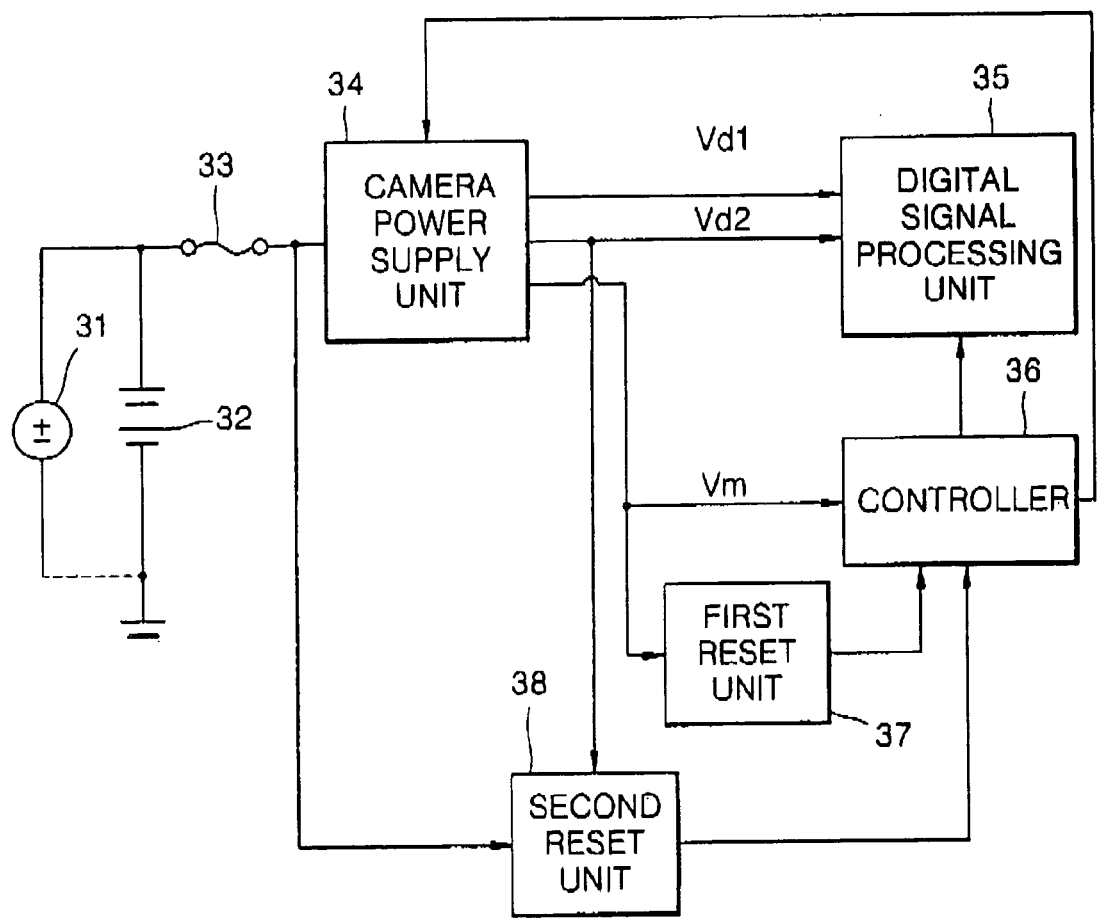
FIG. 3 shows a power supply having a stable reset function according to an embodiment of the present invention.

FIG. 3 shows a power supply having a stable reset function according to an embodiment of the present invention, which is used in a mobile electronic unit, such as a digital camera. The power supply having a stable reset function includes an adapter 31, a battery 32, a fuse 33, a camera power supply unit 34, a digital signal processing unit 35 for processing a video signal and an audio signal of a digital camera under the control of a controller 36, the controller 36 for controlling the overall operation of the digital camera, and first and second reset units 37 and 38. The operation of the respective elements shown in FIG. 3 will be described in association with the waveform diagram of FIG. 4.

Figure 4:
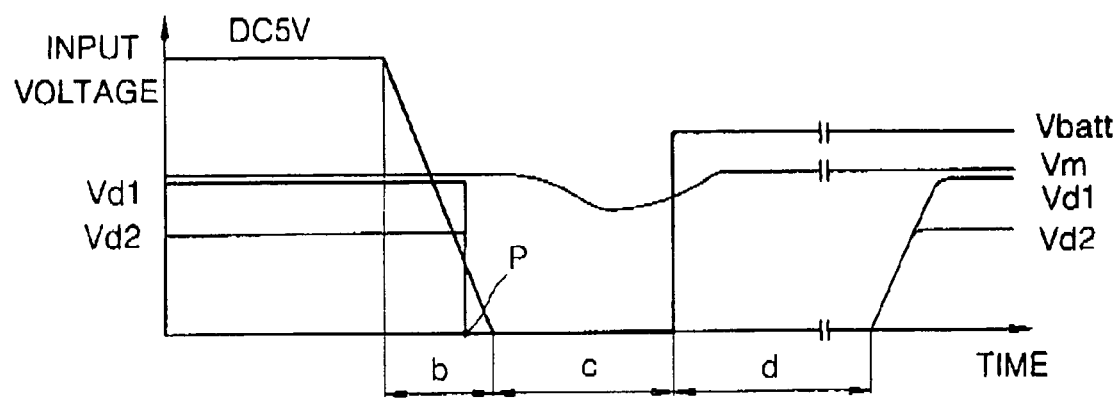
FIG. 4 is a waveform diagram of a source voltage of each unit of FIG. 3.

Referring to FIGS. 3 and 4, the camera power supply unit 34 that supplies source voltages is connected to a power source through the fuse 33. First and second source voltages Vd1 and Vd2, are supplied to the digital signal processing unit 35, and a source voltage Vm is supplied to the controller 36. The controller 36 may be a microcontroller. The camera power supply unit 34 uses the power source supplied from the adapter 31 or the battery 32. For example, Vd1, Vd2, and Vm are 3.3V, 1.8V, and 3.3V, respectively. Vd1 is used as a source voltage used to process a video signal output to an LCD screen, and Vd2 is used as a source voltage of a logic circuit.

The first reset unit 37 determines whether the source voltage Vm for the controller 16 supplied from the camera power supply unit 34 is abnormal and resets the controller 36 if the source voltage Vm is abnormal.

The second reset unit 38 monitors the voltage, that is 5V DC, at an input terminal of the camera power supply unit 34 and the voltage at an output terminal. When the 5V DC power source is supplied from the adapter 31 and the adapter 31 is removed from the digital camera, the second source voltage Vd2 for the digital signal processing unit 35 is reduced to 0V during period b. The second reset unit 38 generates a reset signal when the voltage at the input terminal is less than the second source voltage Vd2 of the digital signal processing unit 35, and applies the generated reset signal to the controller 36.

When the reset signal is applied to the controller 36, the controller 36 controls the camera power supply unit 34 to cut off the first and second source voltages Vd1 and Vd2 for the digital signal processing unit 35 from a point "P" where the reset signal is generated in period b, to a stabilization time d through period c. The first and second source voltages Vd1 and Vd2 for the digital signal processing unit 35 are reduced to 0V at the point "P" during period b, and then, are restored to an original voltage when the stabilization time after the period c passes. The stabilization time varies depending on a time passed on until a user turns on a power switch (not shown) after the controller 36 resets and then is in a standby mode.

Figure 5:
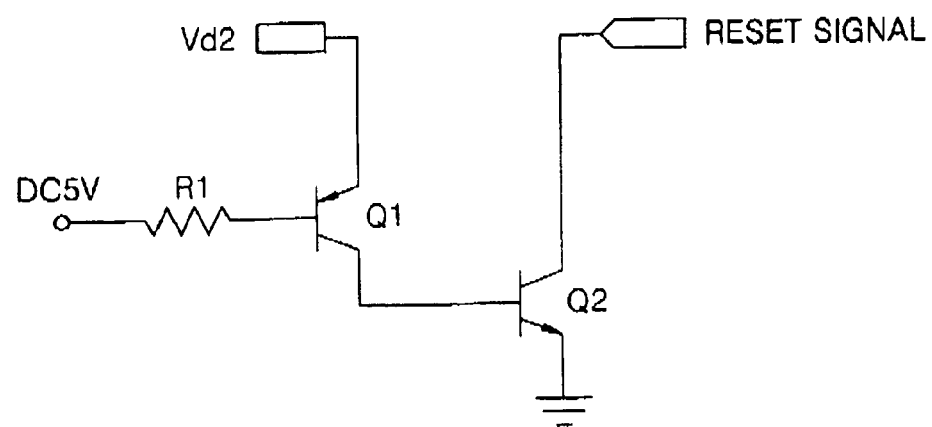
FIG. 5 is a detailed circuit diagram of a second reset unit of FIG. 3.

FIG. 5 is a detailed circuit diagram of the second reset unit 38 of FIG. 3. The second reset unit 38 includes a resistor R1 and first and second transistors Q1 and Q2. Referring to FIG. 5, a second source voltage Vd2 (1.8V) for the digital signal processing unit 35 is applied to an emitter terminal of the first transistor Q1, and a 5V power source supplied from the adapter 31 is applied to a base terminal of the first transistor Q1 through the resistor R1. The first transistor Q1 is turned on when the 5V power source of the adapter 31 applied to the base terminal of the first transistor Q1 is about 0.7V or more less than the second source voltage Vd2 of the digital signal processing unit 35. As such, the second transistor Q2 is turned on and can supply a reset signal to the controller 36.

In other words, when the adapter 31 is removed from the digital camera containing the installed battery 32, the 5V DC power source supplied from the adapter 31 is reduced to 0V during period b. The first transistor Q1 monitors whether the 5V DC power source of the adapter 31 is less than the second source voltage Vd2 of the digital signal processing unit 35. If the first transistor Q1 detects that the DC 5V power source of the adapter 31 is less than 0.7V or more than the second source voltage Vd2 of the digital signal processing unit 35, the reset signal is supplied by the second transistor Q2 to the controller 36. As such, the digital signal processing unit 35 and the controller 36 can be simultaneously reset during period c.

In another embodiment of the present invention, chattering occurs when a battery cover is opened and the battery 32 is completely removed from the digital camera. A problem occurs during periods b and c, which corresponds to the time required to remove the battery 32 from the digital camera and apply a power source from either the adapter 31 or a new battery to the digital camera. In this case, when the battery 32 is removed from the digital camera, the power source Vbatt supplied from the battery 32 is reduced to 0V during period b. The second reset unit 38 monitors a voltage at an input terminal of the camera power supply unit 34, that is, the power source Vbatt of the battery 32, and the voltage at an output terminal, for example, the second source voltage Vd2 of the digital signal processing unit 35. The second reset unit generates a reset signal, and applies the generated reset signal to the controller 36 when the voltage at the input terminal is less than the second source voltage Vd2 of the digital signal processing unit 35. In this way, removing the battery from a digital camera is similar to removing an adapter from a digital camera containing an installed battery, except that the power source Vbatt of the battery 32 is applied to the base terminal of the first transistor Q1.

Also, in the above-described embodiment, 5V DC, in the case of the adapter 31 or the power source Vbatt in the case of the battery 32, is used as the input voltage of the camera power supply unit 34 monitored by the second reset unit 38, and the second source voltage Vd2 (1.8V) of the digital signal processing unit 35 is used as the output voltage of the camera power supply unit 34 monitored by the second reset unit 38. However, an arbitrary source voltage may be used as the voltage of the adapter 31 or battery 32 according to the specification of a mobile electronic unit, and the second source voltage Vd2 of the digital signal processing unit 35 may be replaced with a source voltage used to operate a signal processing unit for processing a video signal or an audio signal of a corresponding mobile electronic unit, preferably, at the lowest positive source voltage.

In the above-described embodiment, the digital camera has been shown. However, the power supply having a stable reset function according to the present invention can be used in a mobile electronic unit, such as a personal digital assistant (PDA) and a mobile phone in which both an adapter and a battery are used, without modifying hardware of the mobile electronic unit.

As described above, according to the present invention, in a mobile electronic unit in which both an adapter and a battery are used, a digital signal processing unit and a controller can be simultaneously reset during a transition period between removing an adapter and applying a battery power source where the battery has been installed in the mobile electronic unit, so that malfunctioning is prevented and a stable operation of the mobile electronic unit is guaranteed.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A power supply having a stable reset function in a mobile electronic unit comprising a digital signal processing unit for processing a video signal or an audio signal input into the mobile electronic unit, the power supply comprising:
    a power supply unit, which generates a plurality of source voltages needed in respective elements of the mobile electronic unit using an input power source supplied from an adapter or battery;
    a first reset unit, which, when at least one output voltage from the power supply unit is abnormal, generates a first reset signal;
    a second reset unit, which, when the input power source from the adapter or battery is less than a predetermined reference voltage, generates a second reset signal, the second reset unit comprising:
        a first transistor, wherein power is supplied by the adapter or battery being applied to a base terminal of the first transistor and the source voltage for the digital signal processing unit being applied to an emitter terminal of the first transistor, and
        a second transistor, which is connected to a collector terminal of the first transistor and generates the second reset signal depending on whether the first transistor is turned on; and
    a controller which is reset by means of one of the first and second reset signals, and when the second reset signal is applied thereto, controls the power supply unit to cut off the source voltage for the digital signal processing unit.

2. The power supply of claim 1, wherein the predetermined reference voltage is a source voltage for the digital signal processing unit.

3. The power supply of claim 1, wherein the predetermined reference voltage is the lowest positive source voltage among the plurality of the source voltages for the digital signal processing unit.

4. The power supply of claim 1, wherein the mobile electronic unit is a digital camera.

5. The power supply of claim 1, wherein the mobile electronic unit is a personal digital assistant.

6. The power supply of claim 1, wherein the mobile electronic unit is a mobile phone.

7. A power supply having a stable reset function in a mobile electronic unit comprising:
    a digital signal processing unit;
    a power supply unit;
    a first reset unit;
    a second reset unit, the second reset unit comprising:
        (a) a first transistor wherein power is supplied by an adapter or a battery and is applied to a base terminal of the first transistor and a source voltage for the digital signal processing unit is applied to an emitter terminal of the first transistor; and
        (b) a second transistor, which is connected to a collector terminal of the first transistor and generates a second reset signal depending on whether the first transistor is turned on; and a controller.

8. The power supply of claim 7 wherein the digital signal processing unit processes a video signal or an audio signal input in the mobile electronic unit.

9. The power supply of claim 7 wherein the power supply unit generates a plurality of source voltages for an element of the mobile electronic unit that uses an input power source supplied from an adapter or a battery.

10. The power supply of claim 7 wherein the first reset unit generates a first reset signal when at least one output voltage from the power supply unit is abnormal.

11. The power supply of claim 7 wherein the second reset unit generates a first reset signal when an input power source from an adapter or a battery is less than a predetermined reference voltage.

12. The power supply of claim 11, wherein the predetermined reference voltage is a source voltage for the digital signal processing unit.

13. The power supply of claim 1, wherein the predetermined reference voltage is the lowest positive source voltage among a plurality of the source voltages for the digital signal processing unit.

14. The power supply of claim 7 wherein the controller is reset by means of a first and second reset signals.

15. The power supply of claim 7 wherein the controller is reset by a second reset signal and cuts off the source voltage for the digital signal processing unit.

16. The power supply of claim 7, wherein the mobile electronic unit is a digital camera.

17. The power supply of claim 7, wherein the mobile electronic unit is a personal digital assistant.

18. The power supply of claim 7, wherein the mobile electronic unit is a mobile phone.

19. A power supply having a stable reset function in a mobile electronic unit comprising a digital signal processing unit for processing a video siral or an audio signal input into the mobile electronic unit, the power supply comprising: a power supply unit, which generates a plurality of source voltages needed in respective elements of the mobile electronic unit using an input power source supplied from an adapter or battery; a controller; means for simultaneously resetting the digital signal processing unit and the controller during a transition period between removing the adapter from the mobile electronic unit and applying power from the battery to the mobile electronic unit, wherein the controller controls the power supply unit to cut off the source voltage for the digital signal processing unit when the controller is reset by the resetting means, the resetting means comprises:

a first reset unit, which, when at least one output voltage from the power supply unit is abnormal, generates a first reset signal; and a second reset unit, which, when the input power source from the adapter or battery is less than a predetermined reference voltage, generates a second reset signal, wherein the second reset unit comprises:

(a) a first transistor wherein power is supplied by an adapter or a battery and is applied to a base terminal of the first transistor and a source voltage for the digital signal processing unit is applied to an emitter terminal of the first transistor; and (b) a second transistor, which is connected to a collector terminal of the first transistor and generates a second reset signal depending on whether the first transistor is turned on.

* * * * *